United States Patent [19]
Dwivedi et al.

[11] Patent Number: 4,849,266
[45] Date of Patent: Jul. 18, 1989

[54] COMPLIANT LAYER

[75] Inventors: Ratnesh K. Dwivedi, Wilmington; Virgil Irick, Jr., Hockessin, both of Del.

[73] Assignee: Lanxide Technology Company, LP, Newark, Del.

[21] Appl. No.: 116,412

[22] Filed: Nov. 3, 1987

[51] Int. Cl.[4] .......................... F16L 9/14; B22D 19/00
[52] U.S. Cl. ................................ 428/34.4; 428/318.4; 428/457; 428/702; 164/98; 29/527.3
[58] Field of Search .............. 428/36, 457, 702, 318.4; 164/98, 100, 101, 102; 29/527.3; 264/259, 265

[56] References Cited

U.S. PATENT DOCUMENTS

| | | | |
|---|---|---|---|
| 3,568,723 | 3/1971 | Sowards | 164/98 |
| 3,919,755 | 11/1975 | Kaneko et al. | 29/527.3 |
| 4,055,451 | 10/1977 | Cockbain et al. | 428/702 |
| 4,291,741 | 9/1981 | Willem | 164/98 |
| 4,676,064 | 6/1987 | Narita et al. | 164/98 |

FOREIGN PATENT DOCUMENTS

| | | | |
|---|---|---|---|
| 61-115662 | 6/1986 | Japan | 164/98 |

*Primary Examiner*—Richard K. Seidel
*Attorney, Agent, or Firm*—Mark G. Mortenson; William E. McShane

[57] ABSTRACT

This invention relates to a new ceramic-metal composite body and a method for producing the same. Particularly, a compliant layer composition is utilized for preventing the rupture of a ceramic article and/or the yielding or failure of a metal during the pouring, solidification and cooling of a molten metal which has been cast around the ceramic. A slurry composition for the compliant layer includes plaster of paris, a liquid vehicle and a filler material. The slurry composition is coated on the ceramic article and thereafter is heat-treated to form a compliant layer. Ceramic-metal composite bodies comprising low strength hollow articles and high expansion coefficient metals may be manufactured according to the method of this invention.

17 Claims, 1 Drawing Sheet

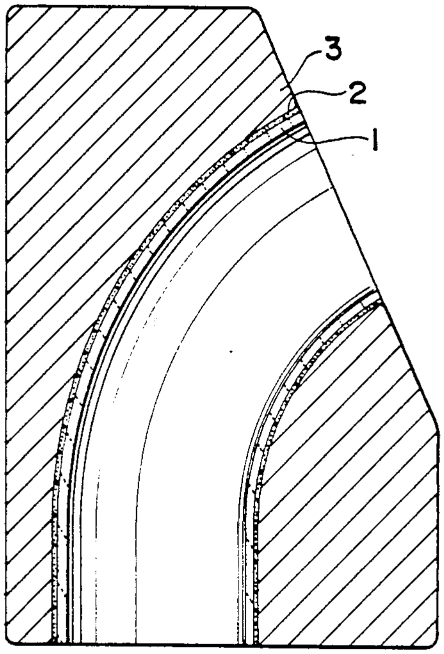
Fig. 1
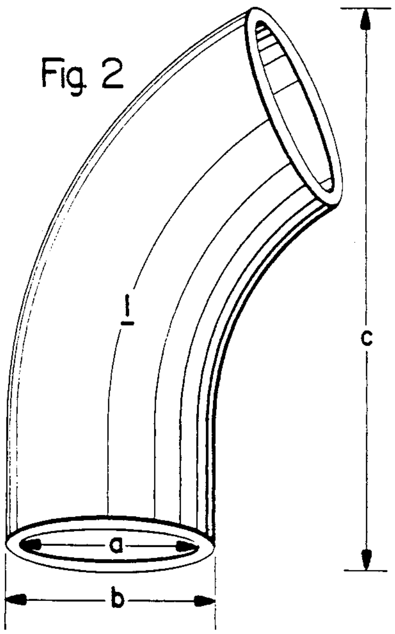
Fig. 2
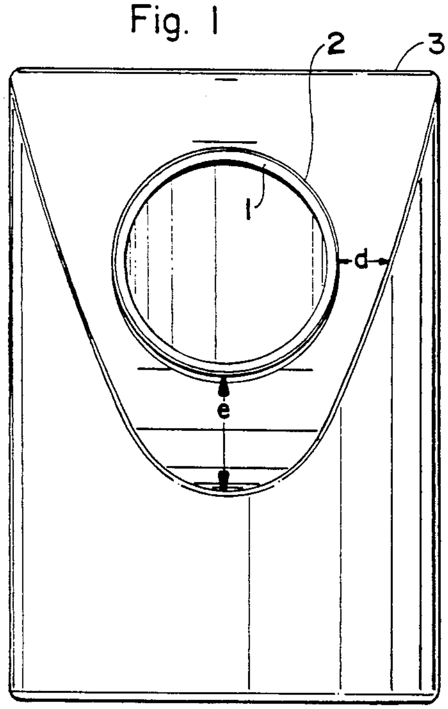
Fig. 3
Fig. 4
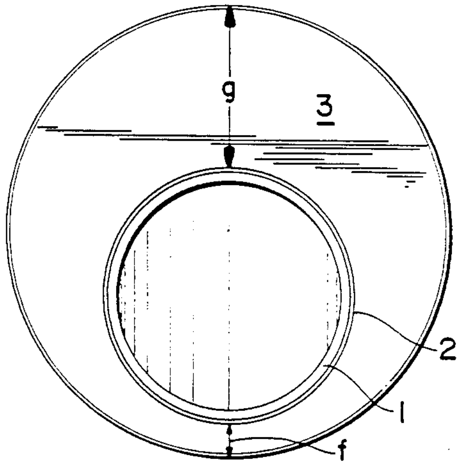

COMPLIANT LAYER

FIELD OF INVENTION

The present invention relates to ameliorating the effect of undesirable stresses which occur during the formation of a ceramic-metal composite body. The invention also relates to the manufacture of ceramic-metal composite bodies which incorporate ceramic articles, particularly low strength ceramic articles.

BACKGROUND OF THE INVENTION

Many different types of composite materials have been developed for different applications. One composite material which has achieved a substantial amount of attention for high temperature/durability applications is the combination of an integral ceramic article within a mass of metal.

The most practical and inexpensive method for forming a composite body having an integral ceramic surrounded by a mass of metal entails solidifying a cast molten metal around a ceramic article. However, when the cast metal solidifies and cools, high compressive stresses can occur in the ceramic article. Particularly, the thermal expansion coefficients of the ceramic and the metal typically differ from each other such that the stresses which are exerted upon the ceramic article can result in crack initiation and/or catastrophic failure of the ceramic. Such crack initiation and/or failure has been especially pronounced in low strength, hollow, ceramic article. To date, there has not been an adequate resolution to this problem of excessive compressive stresses which can lead to the failure of low strength ceramic articles. Moreover, crack initiation and/or failure in a metal has also been a problem in certain applications. For example, when the metal surrounding the ceramic is thin, the greater magnitude of contraction of the metal during cooling can result in tensile stresses in the metal which can lead to yielding or failure thereof.

It frequently is desirable to form an integral ceramic article within a mass of metal for applications which require the conservation of exhaust gas thermal energy, for example, as an exhaust port for an internal combustion engine. Specifically, in reference to the exhaust port for an internal combustion engine, an integral, low strength, hollow ceramic article is at least partially surrounded by a mass of solidified metal. The thermal insulating properties of the ceramic will assist in heating-up a downstream catalytic converter substrate by the hot exhaust gasses at a rapid rate relative to an all-metal exhaust port because the ceramic reduces heat losses of the exhaust gas stream. Such rapid heating is desirable because a catalytic converter substrate does not convert undesirable pollutants from an exhaust gas until it has been heated-up to its operating temperature by the exhaust gas. Particularly, unacceptable amounts of pollutants may be discharged from an exhaust system during the initial warm-up period for a catalytic converter relative to the amount of pollutants discharged once the catalytic converter has been heated. Thus, by incorporating a ceramic within a metal exhaust port, undesirable emissions from an internal combustion engine can be reduced. Additionally, the use of a port liner in a turbocharger will result in higher exhaust stream temperatures, thereby improving the operating efficiency of the turbocharger. Moreover, use of a ceramic within a metal exhaust port reduces the heat energy input from the exhaust gas into the engine coolant. Thus, a smaller cooling system could be utilized for an internal combustion engine.

Various attempts have been made to reduce the compressive stresses on a ceramic article induced by the solidification and cooling of a molten metal around the ceramic. For example, U.S. Pat. No. 3,709,772 to Rice (hereinafter "Rice '772") discloses that a porous, fibrous, resilient refractory layer is applied to an outer surface of a hollow ceramic article prior to casting a metal around the ceramic. The porous refractory layer is applied by wrapping the outer surface of the ceramic article with an aluminum silicate fiber paper having a thickness of 0.120–0.200 inches. Alternatively, it is disclosed that the layer can be applied by "spraying" a liquid suspension of the aluminum silicate fibers against a surface or by "blowing" chopped fibers against a tacky surface. It is disclosed that a resilient layer within this thickness range can tolerate the stresses (i.e., prevent the ceramic from rupturing) generated by casting around the ceramic article an iron or an aluminum alloy having a thickness of 0.1875–0.250 inches.

However, the disclosed aluminum silicate layer is unacceptable in many instances such as sophisticated cylinder head castings, due to its thickness relative to the thickness of the surrounding metal layer. Thus, the strength of the composite body is compromised because of the relatively thick and weak intermediate resilient layer. Moreover, the aluminum silicate layer is wettable by certain molten metals such as aluminum and magnesium at typical metal casting temperatures. Thus, molten metal can tend to penetrate the aluminum silicate layer and thereby inhibit the resilient layer from functioning as desired.

U.S. Pat. No. 3,718,172 to Rice (hereinafter "Rice '172") discloses a cushioning layer of aluminum silicate which is similar to the resilient refractory layer disclosed in Rice '772. Accordingly, this layer suffers from all of the deficiencies of the resilient layer disclosed in Rice '772.

U.S. Pat. No. 4,245,611 to Mitchell et al. discloses the use of a cushioning layer of aluminum silicate between a ceramic insert and a metallic piston body. However, the disclosed cushioning material is similar to the cushioning material disclosed in each of Rice '772 and '712. Thus, this cushioning material is undesirable for all of the reasons previously discussed.

Another alternative to supressing undesirable stresses in a ceramic article involves applying a molding sand mixed with a binder on the ceramic article prior to casting molten metal around the ceramic. Japanese Pat. No. 53-8326 discloses that a molding sand can be applied to an outer surface of the ceramic to form a covering layer having a 1–5 mm thickness thereon. The molding sand can be combined with water or a binder to assist in bonding the sand to the ceramic article. However, the sand is wettable by certain molten metals such as aluminum or magnesium at typical metal casting temperatures. Thus, the molten metal tends to penetrate the porous sand covering and inhibit the sand layer from cushioning against compressive stresses generated by the cooling metal.

In addition to providing some type of intermediate layer between a ceramic article and a solidified molten metal, focus has been placed upon controlling certain physical properties of the ceramic. Particularly, ceramic articles having a controlled porosity and pore size have also been utilized to ameliorate the effect of undesirable compressive stresses.

U.S. Pat. No. 3,568,723 to Sowards discloses casting a molten metal around a ceramic core, said core having a surface porosity in the range of 20–80% and a pore size in the range 25–2500 microns. The surface porosity is achieved by modifying the surface of the ceramic core by such techniques as incorporating a decomposable material in a surface area of the core when the core is being made. This technique is cumbersome to control and adds expense to the process. Moreover, Sowards also discloses various coatings which can be applied on a surface of a ceramic core, said coatings including polystyrene, cemented sodium silicate, a quartz wool pad and silica frit.

U.S. Pat. No. 4,533,579 to Hashimoto also discloses using ceramic article having specific physical properties. Hashimoto discloses that it is desirable to construct the ceramic to have a particular particle size distribution. Particles of less than 44 microns in size account for 14.5–50% of the total and the balance are particles with a maximum size ranging from 500–2000 microns. It is disclosed that this particle size distribution gives the ceramic an improved resistance to compressive stresses. However, failure of the ceramic is only part of the issue; providing some relaxation capability to avoid failure of the metal casting is also important and Hashimoto does not provide any means to avert this particular problem.

German Pat. No. 2,354,254 controls the physical properties of a ceramic article to enhance the resistance of the ceramic to thermal stresses. It is disclosed that heat-insulated castings for exhaust ports of internal combustion engines are formed by casting metal around a flexible ceramic shell which has a smooth outer surface. It is necessary for the ceramic shell to have a modulus of elasticity of 200–5000 $kg/mm^2$, a bending strength of 8–200 $kg/cm^2$, and a wall thickness of less than one-fourth of its inside diameter.

Another ceramic article exhibiting particular physical properties is disclosed in U.S. Pat. No. 3,919,755 to Kaneko et al. This patent is directed to manufacturing heat insulating casting by molding a flexible porous ceramic liner from a mixture of a refractory material and an alumina cement; casting molten metal against the liner; and after casting the molten metal, impregnating the liner with a heat resistant binder. It is disclosed that it is important to avoid impregnating the ceramic liner with a heat resistant binder before casting molten metal to ensure that the liner will survive the casting process.

High strength ceramic articles have also been utilized to ameliorate the effect that thermal stresses have on the ceramic. For example, Japanese Pat. Nos. 60-118366 and 60-216968 disclose casting the molten metal around high strength oxide ceramics. Finally, Japanese Pat. No. 59-232978 discloses casting molten metal around high strength ceramic bodies of stabilized zirconia.

From the foregoing, it can be seen that previous attempts to ameliorate undesirable stresses involved using ceramic articles having relatively thick, porous coatings which are wettable by metals such as aluminum and magnesium at typical metal-casting temperatures; and using ceramics having carefully controlled physical properties. However, ceramic-metal composite bodies which employ thick coatings on a ceramic article are prone to physical damage due to the presence of a relatively thick and weak layer between the metal and the ceramic. Moreover, such coatings can be difficult, and in certain cases expensive, to apply. These known coatings have historically needed to be thick because they permit the penetration of a metal (i.e., are wettable by the metal) and thus, their functioning as a compliant layer has been partially compromised. Moreover, a requirement for specific mechanical properties in a ceramic may reduce the capacity to deliver desirable thermal properties. Further, ceramic articles which require the use of additional impregnation steps can be difficult to maunfacture and add further cost to the construction of the composite body.

A need therefore exists to provide an inexpensive, reliable means for ensuring that ceramic articles will survive the stresses associated with metal casting so as to provide structurally sound ceramic-metal composite bodies. In particular, a need exists for ensuring that molten metal may be cast around a low strength ceramic article without degrading the mechanical properties of the ceramic and without degrading the mechanical properties of the composite body. In addition, a need exists to ensure that when molten metal is cast around a ceramic article and the thickness of the cooling metal is thin relative to the thickness of the ceramic article, and/or the tensile strength of the metal is low compared to the compressive strength of the ceramic, that the metal will not crack due to the development of tensile stresses therein.

SUMMARY OF THE INVENTION

The present invention has been developed in view of the foregoing and to overcome the deficiencies of the prior art.

The invention provides a method for preventing the rupture (i.e., catastrophic failure) of a ceramic article, particularly, a low strength ceramic article, during the solidification and cooling of a molten metal which has been cast around the ceramic article. The invention also provides a method for preventing the mechanical failure of metal which has been cast around a ceramic article when the thickness of the metal is thin relative to the thickness of the ceramic and/or tensile strength of the metal is low compared to the compressive strength of the ceramic.

The invention also relates to a composition for a compliant layer which is to be located between a ceramic article and a metal in a ceramic-metal composite body. The composition which is used to form the compliant layer comprises a mixture of plaster of paris (i.e., calcium sulfate) and at least one filler material. Filler materials such as cristobalite, quartz, kaolin clays, calcium carbonate, alumina, cordierite, etc., can be included with the plaster of paris mixture to prevent the plaster of paris mixture from cracking and/or peeling away from the ceramic article during drying thereof, and/or to modify the mechanical properties of the resultant compliant layer. The mixture of plaster of paris and at least one filler material can be formed into a slurry to facilitate adherence of the mixture to a ceramic article. Typical liquid vehicles for the slurry include water and water-alcohol mixtures. The slurry is typically dried and heated to an elevated temperature to drive off at least some, and in some cases a substantial amount, of the water of hydration from the calcium sulfate. Moreover, at an appropriate elevated temperature, calcium sulfate can react with the metallic component in the at least one filler material to form another crystalline species. For example, if a siliceous material was used as the filler, the Si component from the siliceous material could react with calcium sulfate to form a calcium silicate. Such calcium silicate formation could be either partial or complete (i.e., if proper molar amounts of calcium sulfate and siliceous material were mixed and heated to an appropriate reaction temperature, complete reaction to form a calcium silicate could occur). After the compliant layer has been formed on the ceramic article, molten metal is cast around the ceramic article; and after cooling the metal to a temperature below its melting point, a composite body results.

The compliant layer made according to the invention characteristically exhibits a relative porosity of about at least 30% to ensure that the layer can function properly to absorb undesirable stresses. Moreover, the compliant layer characteristically is not wettable to any appreciable extent by the molten metal at typical metal casting temperatures, even after long exposure, because if the compliant layer were wettable, its intended function could be compromised.

The compliant layer should adhere readily to the ceramic article, not spall or peel away from the ceramic when heated, and be capable of ameliorating stresses generated by the pouring, solidifying and cooling of the molten metal body. Additionally, the compliant layer should not degrade the mechanical properties of the resultant ceramic-metal composite body, thereby producing a superior composite body. Still further, the compliant layer should preferably be made of a relatively low-cost material having a low thermal conductivity and a low Young's Modulus.

The invention can be generally applied to any situation where a reduction in stresses between a solid, substantially solid or hollow ceramic body and a metal is required. Thus, a large number of applications is foreseeable. However, the invention can be specifically applied to a ceramic-metal composite body which is used as an exhaust port liner for an internal combustion engine. For example, a low strength, hollow ceramic article is at least partially surrounded by a cast aluminum-based metal with a compliant layer located therebetween. It is also conceivable that the composite article according to the present invention could be used in many applications which involve the conservation of exhaust gas thermal energy, including turbocharging or turbocompounding.

Thus, the novel compliant layer permits the formation of ceramic-metal composite bodies having a high thermal resistance due to the combination of a low strength hollow ceramic article having a relatively high thermal resistance with a higher strength surrounding metal.

The novel compliant layer also can be applied to a self-supporting ceramic article having a porous core enveloped by, or bearing, a relatively dense skin on at least one surface thereof. Such a self-supporting ceramic article shall be referred to as "porous core, dense skin" article. The porous core, dense skin article is described in detail in copending and Commonly Owned U.S. patent application Ser. No. 908,119, filed Sept. 16, 1986, in the name of Ratnesh K. Dwivedi, which is herein incorporated by reference. The porous core, dense skin article can serve as the ceramic portion of the above-discussed ceramic-metal composite body. The formation of the porous core, dense skin article is discussed in greater detail later herein.

The following terms, as used herein and in the claims, unless stated otherwise, should be interpreted as defined below.

The term "low strength" ceramic article refers to ceramic articles which have a four-point flexural strength of not greater than about 5000 psi (34.5 MPa).

The term "low modulus" refers to materials which have a Young's Modulus of elasticity of not greater than about 70 GPa.

The term "oxidant" means any material having one or more suitable electron acceptors or electron sharers. The material may be a solid, a liquid, or a gas (vapor) or some combination of these. Thus, oxygen (including air) is a suitable oxidant, with air being preferred for reasons of economy.

The term "parent metal" refers to that metal, e.g., aluminum, which is the precursor of a polycrystalline oxidation reaction product, and includes that metal as a relatively pure metal, a commercially available metal having impurities and/or alloying constituents therein, or an alloy in which that metal precursor is the major constituent; and when a specified metal is mentioned as the parent metal, e.g., aluminum, the metal identified should be read with this definition in mind unless indicated otherwise by the context.

The term "oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, a halogen, sulfur, phosphorus, arsenic, carbon, boron, selenium, tellurium, and compounds and combinations thereof including, for example, reducible metal compounds, methane, ethane, propane, acetylene, ethylene, propylene and mixtures such as air, $H_2/H_2O$ and a $CO/CO_2$, the latter two (i.e., $H_2/H_2O$ and $CO/CO_2$) being useful in reducing the oxygen activity of the environment. The resulting "oxidation reaction product" can be used as the ceramic article in a ceramic-metal composite body.

The term "ceramic", as used in this specification and appended claims, is not always limited to a ceramic body in the classical sense, that is, in the sense that it consists entirely of non-metallic, inorganic materials. Rather, the term "ceramic" is sometimes used to refer to a body which is predominantly ceramic with respect to either composition or dominant properties although the body may also contain substantial amounts of one or more metals derived from a parent metal, most typically within the range of from about 1–40% by volume, but may include still more metal.

BRIEF DESCRIPTION OF THE DRAWINGS

For a better understanding of the invention, reference is made to the accompanying drawings, wherein:

FIG. 1 represents a cross-section drawn substantially to scale, in schematic form, of a hollow ceramic-metal composite which is a mockup of an exhaust port which is used to simulate casting stresses that would result if a ceramic article was cast into a cylinder head, the mockup being made according to the invention;

FIG. 2 is a perspective view of the ceramic article shown in FIG. 1 and also is drawn substantially to scale;

FIG. 3 is a perspective and scaled view of the ceramic-metal composite shown in FIG. 1; and FIG. 4 is a bottom view of the ceramic-metal composite shown in FIG. 1 and also is shown substantially to scale.

DETAILED DESCRIPTION OF THE PREFERRED EMBODIMENTS

The present invention is based on the discovery that a porous compliant layer located on at least the outer surface of a ceramic article, particularly a low strength ceramic article, will prevent the ceramic article from rupturing due to the stresses which occur during pouring and cooling of cast molten metal which is cast around the ceramic. Additionally, the compliant layer reduces tensile stresses in the metal which can also occur during cooling of cast molten metal. The porous compliant layer is relatively non-wettable by, for example, a molten aluminum alloy at typical metal casting temperatures. The compliant layer is formed by mixing together plaster of paris and at least one filler material and dispersing the mixture into a liquid vehicle such as water or a water-alcohol mixture. The mixture is formed into a slurry to facilitate application and adherence of the mixture to the ceramic article. The presence of the plaster of paris permits fast setting of the slurry mixture without the need for any other binder. Suitable plaster of paris mixtures include No. 1 Pottery Plaster (hereinafter referred to as Pottery Plaster) produced by United States Gypsum Company which consists essentially of $CaSO_4 \cdot \frac{1}{2}H_2O$, and Bondex which is produced by Bondex Intl. Inc. (hereinafter referred to as Bondex) and consists essentially of 30–35 weight percent $CaCO_3$ and 70–65 weight percent $CaSO_4 \cdot \frac{1}{2}H_2O$. Filler materials which are suitable for use with the plaster of paris mixtures include those materials which prevent the plaster of paris from cracking and/or peeling during drying (i.e., setting or hydrating) thereof. Acceptable filler materials include cristabolite, quartz, alumina, cordierite, kaolin clays, calcium carbonate, etc. Moreover, the filler material should not degrade the overall mechanical properties of a resultant composite body. Typical alcohols which can be used with the water include low boiling point water-miscible alcohols such as methanol and ethanol. The slurry is applied to an outer surface of a ceramic article, allowed to dry (i.e., set) and thereafter results in a hydrated $CaSO_4$ (i.e., $CaSO_4 \cdot xH_2O$, wherein $\frac{1}{2} \leq x \leq 2$) which readily adheres to the outer surface of the ceramic article.

Preferably, the dried slurry is thereafter heated to an elevated temperature of about 700° C.–1000° C. The heating results in a highly porous and compressible compliant layer formed on the outside of a thermally insulating ceramic article. Particularly, the water of hydration is substantially completely driven from the $CaSO_4$ at the elevated temperatures of 700°–1000° C. However, it may not be necessary to drive off any or all of the water of hydration from the hydrated $CaSO_4$. A typical problem associated with exposing hydrated $CaSO_4$ to a high temperature molten metal is the evolution of gas (i.e., "outgassing") from the hydrated $CaSO_4$. Thus, if outgassing is not a specific problem or if the outgassing can be controlled, the heating to an elevated temperature may not be necessary. Thereafter, a molten metal, such as an aluminum alloy, is cast around the ceramic coated with the compliant layer, thereby forming a novel ceramic-metal composite material.

The elevated temperature heating can also promote a chemical reaction between the plaster of paris and the filler material to form a separate crystalline species. For example, if a siliceous filler material was utilized, a chemical reaction could occur between the plaster of paris and siliceous material to form a calcium silicate material such as $CaSiO_3$ and/or $Ca_2SiO_4$. The amount of calcium silicate that would be formed would be dependent upon both temperature and time. For example, the reaction could be minimal at low temperatures (e.g., 700° C.), thus very little calcium silicate may form. However, at high temperatures (e.g., at or above 1000° C.), more calcium silicate may form. Specifically, if proper molar amounts of $CaSO_4$ and a siliceous filler material were utilized, the compliant layer could be predominantly, if not completely, calcium silicate. Calcium silicate may be desirable to form because it also is not wettable to any appreciable extent by the molten metal at typical metal casting temperatures, even after a long exposure to the metal. Thus, in this particular example, the compliant layer can be a mixture of $CaSO_4$ and at least one calcium silicate or the components of the compliant layer may have substantially completely reacted to form at least one calcium silicate.

The filler materials preferably have a low Young's Modulus so that the overall Young's Modulus of the resulting compliant layer is not significantly increased (i.e., the Young's Modulus of the calcium sulfate is not significantly exceeded). The filler materials can also modify, for example, the thermal conductivity, mechanical strength, etc., of the compliant layer. The filler materials can exist as separate species in the compliant layer after the heating to an elevated temperature has occurred or the filler materials can react to form another species. For example, $CaCO_3$ could be added to promote porosity in the compliant layer and if a siliceous donor material was also present, the $CaCO_3$ could facilitate the formation of calcium silicate. The maximum weight percent of such filler materials is limited primarily by the amount of adherence of the slurry to the ceramic article. Stated differently, filler materials may be included in the slurry mixture so long as the additives do not significantly affect the setting or gelling characteristics of the slurry caused by hydration of the calcium sulfate.

The percentages of the principal components of the slurry composition used to form the compliant layer, i.e., the percentages of plaster of paris, liquid vehicle and said at least one filler material may vary and still be capable of protecting the ceramic article against the stresses associated with pouring, solidification and cooling of molten metal. For example, the percentage of plaster of paris and filler materials may each vary from as low as 5 weight percent to as high as 95 weight percent, respectively, of the solids content of the slurry. Also, the percent solids content of the slurry can vary between 10 and 90 weight percent of the slurry. Such weight percentages are acceptable so long as the volume percentages of the liquid vehicle in the slurry exceeds 15 volume percent. For example, such minimum volume percent assures that the slurry can be coated onto the ceramic article. Thus, for each representative composition which discusses weight percent of solids present, the above volume percent of the liquid vehicle also simultaneously occurs. Once again, the upper limits of the amounts of these materials present are dictated by practical considerations, including ease of applying the slurry to the ceramic article, ease of adherence of the slurry to the ceramic article, wettability of the dried and fired compliant layer to molten metals, such as aluminum and magnesium, etc.

The following five compositions are suitable for use as the slurry material which, after heating, forms the compliant layer. These compositions should be considered to be illustrative only and should not be construed as limiting the scope of the invention.

COMPOSITION 1

Either of Bondex or Pottery Plaster can be mixed with water and cristobalite to form a slurry which, when dried and heated, will provide a composition suitable for use as a compliant layer. The slurry composition comprises 50 weight percent solids, of which 50 weight percent is either Bondex or Pottery Plaster and 50 weight percent is cristobalite. Water comprises the remaining 50 weight percent of the composition.

COMPOSITION 2

Either of Bondex or Pottery Plaster can be mixed with cristobalite and a liquid vehicle to provide a slurry mixture for forming the compliant layer. The liquid vehicle comprises 50 weight percent water and 50 weight percent methanol. The solids content of the slurry comprises 10 weight percent of total composition. Of the 10 weight percent solids, either Bondex or Pottery Plaster comprises 10 weight percent and cristobalite comprises 90 weight percent.

COMPOSITION 3

Either of Bondex or Pottery Plaster can be mixed with water and cristobalite to form a slurry which, when dried and heated, will provide a composition suitable for use as a compliant layer. The slurry composition comprises 50 weight percent solids, of which 70 weight percent is either Bondex or Pottery Plaster and 30 weight percent is cristobalite. Water comprises the remaining 50 weight percent of the composition.

COMPOSITION 4

Either of Bondex or Pottery Plaster can be mixed with cristobalite and a liquid vehicle to provide a slurry mixture for forming the compliant layer. The liquid vehicle comprises 50 weight percent water and 50 weight percent methanol. The solids content of the slurry comprises 10 weight percent of the total composition. Of the 10 weight percent solids, either Bondex or Pottery Plaster comprises 70 weight percent and cristobalite comprises 30 weight percent.

COMPOSITION 5

Either of Bondex or Pottery Plaster can be mixed with water and EPK kaolin supplied by the Feldspar Corporation and having a composition approximately as follows: 46.5 weight percent $SiO_2$, 37.6 weight percent $Al_2O_3$, 0.5 weight percent $Fe_2O_3$, 0.4 weight percent $TiO_2$, 0.2 weight percent $P_2O_5$, 0.3 weight percent CaO and small amounts of MgO, $Na_2O$, $K_2O$, $SO_3$ and $V_2O_5$, to provide a slurry mixture for forming a compliant layer composition. The solids content of the composition comprises 95 weight percent Bondex or Pottery Plaster and 5 weight percent EPK kaolin. The liquid vehicle comprises 50 weight percent of the total composition.

Each of the above-representative compliant layer slurry compositions may be employed in the manufacture of ceramic-metal composites comprising an inner ceramic article, an intermediate compliant layer and an outer region of metal. It should be noted that thermally decomposable components such as cellulose, flour, sawdust, etc., could be added to the slurry composition to modify the porosity of the resultant compliant layer. It may be desirable to modify the porosity to control the Young's Modulus and crushability of the compliant layer.

A ceramic-metal composite body according to the invention is shown in cross-section in FIG. 1, wherein the numeral 1 represents the ceramic article utilized as an inner ceramic core, the numeral 2 represents the compliant layer and the numeral 3 represents the outer metallic layer. These same reference numerals have been used throughout each of the Figures. It is noted that each of FIGS. 1–3 have been drawn substantially to scale; however, the thickness of the compliant layer has been exaggerated for purposes of clarity. The actual thickness of the compliant layer with respect to the other dimensions of the composite body is discussed later herein.

To manufacture a ceramic-metal composite body according to the invention, a ceramic article should be formed first. Various materials are suitable to be used as the ceramic article. Compositions including oxides such as alumina, cordierite, zirconia and aluminum titanate, carbides such as silicon carbide, nitrides such as silicon nitride, borides such as titanium diboride, etc., are well suited. Particularly, the ceramic should be capable of withstanding the hot corrosive exhaust gasses of an internal combustion engine without significantly deteriorating. Moreover, the ceramic article, should, at least initially (i.e., during engine warm-up), thermally insulate a surrounding metal from the hot exhaust gasses. Thus, the ceramic article typically is porous. Such porosity typically results in the ceramic having a four-point flexural strength at room temperature of not greater than about 5000 psi (34.5 Mpa) and a Young's Modulus of not more than about 70 GPa. It has been discovered that porous alumina and cordierite are well suited oxide compositions to be used for the ceramic article which is to line an exhaust port for an internal combustion engine. The ceramic article can be formed by any suitable method including slip casting, dry pressing and reacting a molten metal with an oxidant to form an oxidation reaction product which is characterized as "porous core, dense skin" (described in greater detail below).

Once the ceramic has been formed, at least an outer surface thereof is then coated with a slurry composition comprising plaster of paris, a liquid vehicle and a filler material. The slurry composition may be applied by well known techniques such as spraying, painting and dip-coating. If the ceramic article is hollow, then some type of provision should be made for preventing the slurry composition from adhering to an inner surface of the ceramic. Either the ends of the hollow ceramic could be plugged with an appropriate plug, or once the slurry has dried, the excess slurry can be removed by an appropriate technique including sanding, sand-blasting, etc. The slurry composition is typically dried to remove substantially all of the liquid vehicle therefrom to provide a porous compliant layer over at least the outer surface of the ceramic.

The slurry is dried on the ceramic article by placing the ceramic in a conventional furnace in atmospheric air thereby forming a coating on the ceramic. Drying is preferably effected at a temperature at or just below the boiling point of the liquid vehicle (i.e., about 70°–90° C. for water) for a sufficient amount of time to effect removal of substantially all of the physically attached liquid vehicle in the slurry. However, drying could also occur at room temperature so long as a sufficient amount of time is allotted for the drying procedure. After the slurry has dried, the coated ceramic article, preferably, is then heated to an elevated temperature of about 700°-1000° C. to remove substantially all of the water of hydration from the $CaSO_4$. Moreover, as previously discussed, depending upon the particular temperature and amount of time, a reaction between the plaster of paris and filler material may occur. Specifically, if the filler material is a siliceous material, at least one calcium silicate may be formed. This heating results in a compliant layer coating which adheres to the ceramic article.

Typically, the porosity of the compliant layer is at least 30%, because if the porosity is less than 30%, the Young's Modulus of the compliant layer could be so high that an undesirable amount of stress would be transferred to the ceramic article. Additionally, a porosity of at least 30% helps to ensure that the compliant layer will ameliorate the effect of mechanical and thermal stresses. If the porosity is too high, the compliant layer may spall or flake away from the ceramic article. However, a preferred range for the porosity is 40-70%, depending upon the particular composition of the ceramic article, compliant layer and metal. Additionally, the method for forming the ceramic article may also influence the required amount of porosity in the compliant layer. The thickness of the coating can be controlled by the particle size of the solids suspended in the slurry, coating time and by the percent solids content of the slurry. In this regard, the thickness of the coating increases as the particle size, coating time and solids content of the slurry increases.

Still further, the thickness of the slurry coating can also be controlled by the number of coatings placed on the ceramic article. For example, if the article is coated by a dipping process, the number of times that an article was dipped could control the thickness of the coating. However, from an economic standpoint, it is desirable to apply only a single layer of coating. It is also noted that each coating technique could result in different densities for the compliant layer. For example, if a plurality of thin coatings were applied by spraying, it would be expected that the resultant compliant layer would have a greater density than a compliant layer which are formed by a single dip-coating step.

The coated article is then placed in a suitable mold, such as a mold made from steel or graphite, such that a molten metal can be cast around the coated article. If the coated article is hollow, appropriate steps are taken to prevent molten metal from entering into the hollow cavity. For example, a refractory material such as fiber wool can be stuffed into the hollow cavity. If the composite body is to be used as an exhaust port, typical metals which would be cast around the ceramic include aluminum, copper, zinc, magnesium and alloys thereof. However, other metals suitable for an exhaust port and compatible with the process disclosed herein could also be utilized. The molten metal is cast around the coated article and is permitted to solidify around the coated article, thereby forming a ceramic-metal composite body. When the molten metal solidifies and begins to cool, compressive stresses are induced in the ceramic article as a result of the difference in thermal expansion coefficients between the surrounding metal and the ceramic. Additionally, when the thickness of the metal is thin relative to the thickness of the ceramic, and/or the tensile strength of the metal is low compared to the compressive strength of the ceramic, tensile stresses may result in the metal. Although the resulting compressive and tensile stresses could be sufficient to cause the ceramic article to rupture and the metal to fail or yield, the presence of the compliant layer, by virtue of its low Young's Modulus, high porosity and crushability, ameliorates the effect of such stresses by itself being crushed.

Without intending to be bound by any specific theory or explanation, the following is believed to explain how the compliant layer prevents the low strength ceramic article from rupturing and the metal from failing or yielding. Molten metals, such as aluminum and aluminum alloy metals, at typical metal casting temperatures of 700° C. to 900° C. do not "wet" the compliant layer (i.e., the molten metal does not penetrate the surface of the compliant layer in any significant amount). Thus, a relatively sharp or well-defined interface exists between the metal and the compliant layer. The well-defined interface assists in better distribution of stresses generated by the solidifying metal. Specifically, the compliant layer can be compressed substantially uniformly by the cooling metal; and due to the relatively low strength and high porosity of the compliant layer, the compliant layer can be crushed by the cooling metal. Thus, it is the crushing of the compliant layer which absorbs the undersirable stresses.

To manufacture ceramic-metal composites according to the invention, the thicknesses of the ceramic article, compliant layer and the surrounding metal are adjusted simultaneously in accordance with the physical and thermal properties of the ceramic article, metal and the compliant layer composition to achieve a desirable composite body. For example, the wall thickness of a compliant layer and of a hollow ceramic article will increase as the difference between the thermal expansion coefficients of the metal and the ceramic article increases. Preferably, ceramic articles with a thermal expansion coefficient of at least $2\times10^{-6}$ in/in·°C. and metals with a thermal expansion coefficient of less than $23\times10^{-6}$ in/in·°C. are combined to produce a ceramic-metal composite according to the invention. Preferably the value of the difference in thermal expansion coefficient between the ceramic and the metal is less than $20\times10^{-6}$ in/in·°C. so that the stresses are not so large that the compliant layer can not function to mitigate their effect. Moreover, the magnitude of the thermal stresses will also increase as the melting point of the metal increases. Thus, when the low strength hollow ceramic has an outer diameter of about 3.5-4.5 cm, a wall thickness of about 1.5-3.5 mm and is surrounded by a metal varying in thickness from 0.6 cm to 3.5 cm, the thickness of the compliant layer should be maintained in the preferred range of 0.25 mm to 1.5 mm. Compliant layers in this thickness range are preferred to ensure that the ceramic will be sufficiently bonded to the surrounding metal so that the ceramic will not separate from the metal due to vibration. Particularly, while a thick compliant layer could absorb all undesirable stresses, the thick layer could also compromise the overall integrity of the composite body. However, the layer should not be so thin that it cannot absorb the undesirable stresses. Thus, there is a balancing which must occur relating to the thickness of the compliant layer. However, it is preferable for the thickness of the compliant layer to be minimized.

As previously discussed, a large potential number of combinations of compliant layer compositions and metals may be employed to result in ceramic-metal composite bodies according to the invention. Ceramic-metal composite bodies which have a variety of configurations may be produced by appropriate selection of the physical and thermal properties of the compliant layer, metal and ceramic article. Based on these physical properties, the slurry for the compliant layer composition comprises 5–95 weight percent plaster of paris (e.g., Pottery Plaster or Bondex) and at least one filler material (e.g. cristobalite) present in an amount of 5–95 weight percent as the solids portion of the slurry (i.e., plaster of paris and the filler material should each be at least 1.0 volume percent); a liquid vehicle such as water or water-alcohol mixtures in a sufficient amount to facilitate adherence of the slurry to the ceramic article, and once the slurry is dried and fired on the ceramic, it can be surrounded by metallic alloys of such metals as aluminum, cooper, zinc and magnesium. Such metals can be combined with ceramic articles comprising oxides, carbides, borides and nitrides to provide desirable metal-ceramic composite bodies.

It is noted that it may be advantageous to preheat a ceramic article with the compliant layer coated thereon to a temperature of, for example, 400° C. to reduce the thermal stresses on the ceramic. Particularly, by preheating the ceramic prior to contacting it with the molten metal, the difference in temperature between the ceramic and molten metal is reduced, thus reducing the thermal stresses exerted on the ceramic. Such preheat temperature can be achieved either by preventing the coated articles from falling below a temperature of 400° C. after the initial elevated temperature heating of 700°–1000° C., or the coated article can be completely cooled after the initial heating and thereafter preheated to 400° C. It is also noted that the compliant layer may thermally insulate the ceramic body from the molten metal. Thus, the compliant layer may also reduce the thermal stresses on the ceramic by reducing the thermal gradient experienced by the ceramic.

The following are examples of the present invention and the examples are intended to be illustrative of various aspects of the manufacture of ceramic metal composite bodies. However, these examples should not be construed as limiting the scope of the invention.

EXAMPLE 1

The goal of this procedure was to form a composite body which simulated the production of an exhaust port in an internal combustion engine. A plurality of cordierite ceramic articles was prepared by conventional slip casting and firing techniques: The cordierite articles had a fourpoint flexural strength of about 3000–3300 psi (20.6 to 22.7 MPa), an expansion coefficient of about $2.5\times10^{-6}$ in/in·°C., and a porosity of about 25 volume percent. The cordierite articles were shaped for use as an exhaust port liner for an internal combustion engine. The articles were substantially L-shaped as shown in FIG. 2, wherein the inner diameter "a" of each hollow article was approximately 3.3 cm, the outer diameter "b" was approximately 3.70 cm and the overall height "c" was approximately 9.0 cm.

Temporary plugs were placed into each end of the ceramic articles and the articles were dipped into a slurry comprising No. 1 Pottery Plaster, water and 500-grit cristobalite identified by the tradename Minusil which, typically, undergoes at least a partial phase transformation between the alpha and beta phases at about 200°–300° C. The water was present as about 50 weight percent of the mixture, the No. 1 Pottery Plaster was about 35 weight percent of the mixture and the cristobalite was about 15 weight percent of the mixture. The coated ceramic articles were then dried at approximately 90° C. for approximately 2–4 hours. After drying, the coated articles were then heated to a temperature of approximately 700° C. at a heating rate of approximately 200°–300° C./hour and held at that temperature for approximately 1–2 hours to promote at least the removal of the water of hydration from the calcium sulfate. The result was a compliant layer having a thickness of approximately 1 mm and a porosity ranging between approximately 45–65 volume percent. Coated ceramic articles were prevented from falling below a temperature of about 400° C. (i.e., after the initial elevated temperature heating) prior to the molten metal being poured therearound.

The fired ceramic articles were placed in molds and a slightly modified 380.1 aluminum alloy from Belmont Metals was cast around the coated ceramic articles. The modified 380.1 aluminum alloy had a composition of approximately 2.5–3.5 weight percent Zn, 3.0–4.0 weight percent Cu, 7.5–9.5 weight percent Si, 0.8–1.5 weight percent Fe, 0.2–0.3 weight percent Mg; 0–0.5 weight percent Mn, 0–0.001 weight percent Be, and 0–0.35 weight percent Sn. The solid metal had a thermal expansion coefficient of about $21\text{–}23\times10^{-6}$ in/in·°C.

The metal was melted in a clay-graphite crucible using a standard induction furnace and was heated to about 800° C. prior to being poured into the molds. The metal was permitted to solidify and cool for approximately 15 minutes to one hour and the molds were then stripped away. One of the resulting mockups of an exhaust port is shown in perspective in FIG. 3. The minimum thickness of aluminum alloy on the inclined face of each exhaust port was approximately 1.0 cm and is represented by "d", while the maximum thickness of aluminum alloy was 2.5 cm and is represented by "e". A bottom view representative of each exhaust port is shown in FIG. 4. The minimum thickness of aluminum alloy on the bottom portion was approximately 0.7 cm and is represented by "f", while the maximum thickness of aluminum alloy was approximately 2.5 cm and is represented by "g". The ceramic articles were not ruptured during solidification of the molten metal, and each final product was a ceramic-metal composite engine port having uniform bonding between the ceramic article and the metallic layer.

EXAMPLE 2

The procedure of Example 1 was followed to form a plurality of composite bodies. However, Bondex was used instead of No. 1 Pottery Plaster. Thus, the solids content of the composition applied to the ceramic was approximately 20 weight percent calcium carbonate, 50 weight percent $CaSO_4\cdot\frac{1}{2}H_2O$, and 30 weight percent cristobalite. Accordingly, the compliant layer which was formed on each ceramic article after drying and firing the slurry comprised primarily calcium sulfate with small amounts of calcium silicate included therein, said layer having substantially the same porosity as the compliant layer in Example 1. The ceramic articles did not rupture during solidification of the molten metal and each final product comprised a ceramic-metal composite body which had highly uniform bonding between the ceramic article and the metallic layer.

EXAMPLES 3-4

The goal of this procedure was to form a ceramic-metal composite body which simulated the production of an exhaust port for an internal combustion engine. The primary difference between these examples and each of preceding Examples 1 and 2 is that the ceramic article is made by a completely different process. Particularly, a so-called "porous core, dense skin" ceramic article can be coated with the novel compliant layer, as discussed in each of Examples 1 and 2, and once the ceramic is prepared, the composite body can be prepared in an identical manner according to each of the two examples set forth above.

Briefly described, the porous core, dense skin article is made by a controlled oxidation reaction of a parent metal with an oxidant to "grow" an oxidation reaction product. The method entails preparing a preform of a predetermined shape comprising a parent metal and a filler material, both in particulate form, wherein said parent metal is distributed through said filler material. The volume percent of parent metal is sufficient to form a volume of oxidation reaction product which exceeds the potentially available spatial volume within the preform and therefore provides a residual volume of parent metal to undergo further oxidation reaction for development of the dense surface layer. That is, the volume percent of the oxidation reaction product resulting from the oxidation of parent metal is greater than any spatial volume initially present as porosity in the preform plus any spatial volume created within the preform by a reaction of the parent metal, or its oxidation reaction product, with the filler, so long as the filler is reactive. Process conditions are controlled to maintain the parent metal in a molten state in the presence of the oxidant, with which it reacts on contact to form an oxidation reaction product. The process is continued to induce transport of the molten metal through the oxidation reaction product toward the oxidant to continue forming additional oxidation reaction product upon contact with the oxidant within the preform and to fill any pore volume therewith. Concurrently, voids are formed throughout the preform substantially or partially replicating the configuration of the parent metal as it existed in the original preform. Once any initial pore volume of the preform is filled with oxidation reaction product, residual molten metal continues to migrate under the controlled process conditions through the oxidation reaction product and toward the oxidant to at least one surface of the preform to develop additional oxidation reaction product as a substantially dense layer overlaying and integral with the porous core which develops from the original preform. The dense layer of skin overgrows the voids which form by the inverse replication of the configuration of parent metal originally distributed through the preform, and therefore is substantially dense relative to the core.

The resulting porous core, dense skin composite exhibits superior wear and erosion properties relative to the porous core, and the porous core possesses or exhibits its superior thermal insulating properties relative to the dense skin. The thickness of the skin relative to the porous core is between 1/5 and 1/50. Further, the composite body tends to have improved thermal conductivity in the directions parallel to its surface within the dense skin layer while maintaining lower thermal conductivity properties perpendicular to its surface through its porous core. These characteristics are governed, and the resultant properties of the finished article are tailored, in part by appropriate selection of the constituents of the preform, the oxidant or oxidants employed and by the process conditions.

A further feature of the porous core, dense skin article is the structural strength of the article, which is due to the denser, finer-grained microstructure of the skin relative to the core. Stresses upon a structural body, such as torsional and bending stresses, typically are maximized in value at the surface of the structural body. Thus, the strong, dense skin of the composite body maximizes a potential for the otherwise weak, porous core to serve structural needs, while yet retaining the low thermal conductivity and light weight characteristics of the core. Thus, the porous core, dense skin article is ideally suited for use as a ceramic article for the metal-casting process discussed above.

The porous core, dense skin articles may comprise up to about 25% or more by volume of metallic constituents, preferably from about 3 volume percent to about 10 volume percent. The four-point flexural strength of the porous core matrix (i.e., the strength of the porous core without the dense skin coated thereon) typically falls within the range of about 2500–5000 psi (17.2–34.5 MPa).

The complete procedures for forming the porous core, dense skin ceramic article shall not be discussed herein because they are discussed in detail in copending and commonly owned U.S. patent application Ser. No. 908,119, in the name of Ratnesh K. Dwivedi, which has been herein incorporated by reference. However, desirable porous core, dense skin ceramic articles preferably had a 5–10 volume percent of parent metal remaining in the ceramic, and for a cross-section which is 3 mm–5 mm, the dense skin will have an approximate thickness of 0.1 mm–0.5 mm. The four-point flexural strength for the porous core was about 4000 psi (27.5 MPa), the Young's Modulus was about 160 GPa and the thermal expansion coefficient was $9\text{–}10\times10^{-6}$ in/in·°C. It is noted that it was necessary to determine the mechanical properties of only the porous core matrix without the dense skin therein due to difficulties in preparing appropriate specimens for testing.

The porous core, dense skin ceramic was not fractured during solidification of the molten metal and the final product comprised a ceramic-metal composite which had highly uniform bonding between the ceramic and the metallic layer.

EXAMPLE 5

The procedure of Example 4 was followed (i.e., Bondex was used) except that the dried slurry composition was heated to a temperature of about 900° C. The porous core, dense skin ceramic was not ruptured during solidification of the molten metal and the final product comprised a ceramic-metal composite which had highly uniform bonding between the ceramic and the metallic layer.

COMPARATIVE EXAMPLES

To determine the benefit of the compliant layer, a plurality of cordierite ceramic articles discussed in Example 1 and a plurality of the so-called "porous core, dense skin" ceramic articles discussed in Examples 3-4 were placed in molds and preheated to a temperature of about 400° C. The same 380.1 aluminum alloy from Belmont Metals was cast around the uncoated ceramic articles. The metal was at a similar temperature of about 800° C. prior to it being poured into the molds. The metal was permitted to solidify and cool for approximately 15 minutes to one hour and the molds were then stripped away.

In each case, the uncoated ceramic articles were found to contain macro-cracks therein. Particularly, in each of the ceramic articles, cracks were observed to extend between inner and outer surfaces of the hollow ceramic articles, with a large concentration of cracking occurring near the elbow of the ceramic articles 1. Moreover, in some of the cordierite ceramic articles, extreme heaving and separation occured therein. All of such cracking and heaving is unacceptable if the ceramic body is intended to be used as an exhaust port liner.

Thus, it is clear that the compliant layer has a significant effect on the amount of cracking in the ceramic article. Particularly, desirable port liners cannot be made of the compositions disclosed herein without the compliant layer being located on at least a portion of the outer surface thereof.

While the present invention has been disclosed in its preferred embodiments, it is to be understood that the invention is not limited to the precise disclosure contained herein, but may otherwise be embodied with various changes, modifications and improvements which may occur to those skilled in the art, without departing from the scope of the invention as defined in the appended claims.

We claim:

1. A ceramic-metal composite body, comprising:
a ceramic article having an outer surface;
a metal casting encasing at least a portion of said outer surface; and
an intermediate compliant layer disposed on at least a portion of said outer surface and intimately engaged by said metal, said compliant layer reducing stresses generated by the metal when the metal, as molten, is cast and cooled thereabout, said compliant layer comprising calcium sulfate as a major component thereof.

2. The ceramic-metal composite body of claim 1, wherein said ceramic article comprises a material selected from the group of materials consisting of alumina, cordierite and an oxidation reaction product of an aluminum particulate parent metal with an oxidant to form alumina with aluminum metal included therein.

3. The ceramic-metal composite body of claim 2, wherein said ceramic article is hollow and has a four-point flexural strength of not greater than about 5000 psi and a Young's Modulus of not greater than about 70 GPa.

4. The ceramic-metal composite body of claim 3, wherein said oxidation reaction product comprises a porous core, dense skin material.

5. The ceramic-metal composite body of claim 4, wherein said porous core, dense skin material comprises a material having 5–10 volume percent of aluminum in the aluminum matrix and a ration between the thickness of the skin relative to the porous core is between 1/5 and 1/50.

6. The ceramic-metal composite body of claim 5, wherein said porous core, dense skin material is hollow and has a four-point flexural strength for the porous core of about 4000 psi, a Young's Modulus of about 160 GPa and a thermal expansion coefficient of about 9–$10\times10^{-6}$ in/in/°C.

7. The ceramic-metal composite body of claim 1, wherein said metal comprises a metal selected from the group consisting of aluminum, copper, zinc, magnesium and alloys thereof, said metal being a thermal expansion coefficient of less than about $20\times10^{-6}$ in/in/°C.

8. The ceramic-metal composite body of claim 1, wherein said intermediate compliant layer further comprises a filler material.

9. The ceramic-metal composite body of claim 8, wherein said filler material comprises at least one material selected from the group consisting of cristobalite, quartz, kaolin clays, alumina and cordierite.

10. A ceramic-metal composite body, comprising:
a hollow ceramic article comprising a material selected from the group of materials consisting of alumina, cordierite and an oxidation reaction product of an aluminum particulate parent metal with an oxidant to form alumina with aluminum metal included therein, said hollow ceramic article having an inner surface and an outer surface;
an intermediate compliant layer comprising calcium sulfate as a major component thereof, said compliant layer having a porosity of at least about 30 volume percent; and
an outer layer of metal intimately engaging said intermediate compliant layer, said outer layer of metal comprising a metal selected from the group of metals consisting of aluminum, cooper, zinc, magnesium and alloys thereof, wherein said compliant layer reduces stresses generated by the metal when the metal, as molten, is cast and cooled thereabout.

11. The ceramic-metal composite body of claim 10, wherein said compliant layer has a porosity of about 40–70 volume percent.

12. The ceramic-metal composite body of claim 10, wherein said oxidation reaction product comprises a porous core, dense skin article.

13. The ceramic-metal composite body of claim 12, wherein said porous core, dense skin article comprises a material having 5–10 volume percent of aluminum in the aluminum matrix and a ratio between thickness of the skin relative to thickness of the porous core is between 1/5 and 1/50.

14. The ceramic-metal composite body of claim 13, wherein said porous core, dense skin article has a four-point flexural strength for the porous core of about 4000 psi, A Young's Modulus of about 160 GPa and a thermal expansion coefficient of about 9–$10\times10^{-6}$ in/in°C.

15. The ceramic-metal composite body of claim 10, wherein said intermediate compliant layer further comprises a filler material.

16. The ceramic-metal composite body of claim 15, wherein said filler material comprises at least one material selected from the group consisting of cristobalite, quartz, kaolin clays, alumina and cordierite.

17. A ceramic-metal composite body, comprising:
a ceramic article having an outer surface;
a metal casting encasing at least a portion of said outer surface; and
an intermediate compliant layer disposed on at least a portion of said outer surface and intimately engaged by said metal, said compliant layer reducing stresses generated by the metal when the metal, as molten, is cast and cooled thereabout, said compliant layer comprising calcium silicate as a major component thereof.

* * * * *